(12) United States Patent
Chou et al.

(10) Patent No.: US 9,841,609 B1
(45) Date of Patent: Dec. 12, 2017

(54) ASSEMBLY METHODS OF A SMA ASSEMBLY AND AN OIS DEVICE

(71) Applicant: SAE Magnetics (H.K.) Ltd., Hong Kong (CN)

(72) Inventors: Sidney Shen Kuang Chou, Hong Kong (CN); Yiu Sing Ho, Hong Kong (CN); Kam Fung Yip, Hong Kong (CN); Jian Feng He, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 15/194,924

(22) Filed: Jun. 28, 2016

(30) Foreign Application Priority Data

Jun. 6, 2016 (CN) .......................... 2016 1 0393280

(51) Int. Cl.
| | |
|---|---|
| *B23K 28/00* | (2006.01) |
| *G02B 27/64* | (2006.01) |
| *G03B 5/00* | (2006.01) |
| *G02B 7/02* | (2006.01) |
| *B23K 1/00* | (2006.01) |
| *B23K 1/005* | (2006.01) |

(52) U.S. Cl.
CPC ............ *G02B 27/646* (2013.01); *B23K 1/005* (2013.01); *B23K 1/0016* (2013.01); *G02B 7/023* (2013.01); *G02B 7/025* (2013.01); *G02B 7/026* (2013.01); *G03B 5/00* (2013.01); *G03B 2205/0076* (2013.01)

(58) Field of Classification Search
CPC ........... F03G 7/065; G03B 3/10; G03B 13/34; G03B 17/02; G03B 17/425; G03B 2205/0053; G02B 7/02
USPC .................. 359/819; 228/135, 175, 178, 182
See application file for complete search history.

(56) References Cited

U.S. PATENT DOCUMENTS

| | | | |
|---|---|---|---|
| 2009/0295986 A1* | 12/2009 | Topliss | F03G 7/065 348/374 |
| 2011/0205647 A1* | 8/2011 | Osaka | F16F 1/027 359/824 |
| 2012/0092547 A1* | 4/2012 | Hata | F03G 7/065 348/345 |

* cited by examiner

*Primary Examiner* — Erin Saad
(74) *Attorney, Agent, or Firm* — Nixon & Vanderhye PC (57) ABSTRACT

An assembly method of a SMA assembly, includes disposing a lens holder unit on a SMA unit, the lens holder unit being provided with a first spring, a lens holder and a coil that are mounted on the first spring, with the first spring pressed against a mounting surface of the SMA unit; and bonding the first spring of the lens holder unit with the mounting surface of the SMA unit. The assembly process is simplified, the coating and soldering space become big to facilitate the bonding process, and the joining force between the SMA unit and the lens holder unit is enhanced.

10 Claims, 7 Drawing Sheets

ASSEMBLY METHODS OF A SMA ASSEMBLY AND AN OIS DEVICE

This application claims priority to CN Patent Application No. 201610393280.6 filed Jun. 6, 2016, the entire content of which is hereby incorporated by reference.

FIELD OF THE INVENTION

The present invention relates to technical field of optical image stabilization (OIS) devices for cameras, and more particularly to assembly methods of a shape memory alloy (SMA) assembly and an OIS device with the SMA assembly.

BACKGROUND OF THE INVENTION

With the developments of demands for compact and functional electronic products such as mobile phones or tablet PC with cameras, the requirements for the cameras driver become higher, especially for the optical image stabilization.

Thus optical image stabilizer (OIS) is applied to camera lens that requires high quality images, to prevent the image damage caused by the hand shaking during the use of the camera. Conventional OIS devices include VCM (voice coil motor) OIS devices, SMA OIS devices, VCM-SMA OIS devices, piezoelectric OIS devices, and stepper motor OIS devices, etc. The VCM-SMA OIS devices become popular due to the quick driving speed, small size, lower power and higher efficiency.

Following is the assembly process for this VCM-SMA OIS device.

First, assembling the VCM assembly in advance. Concretely, the conventional VCM assembly includes a yoke assembly and a lens holder assembly. The yoke assembly includes a yoke, a coil and four magnets located at four corners of the yoke, these elements are fixed temporarily by means of UV coating. And then, the yoke assembly is mounted to the lens holder assembly which includes a bottom, a lens holder, and four spacers. Concretely, the lens holder is supported by the bottom, and the four spacers are fixed temporarily on the bottom. During the assembly, the yoke assembly is covered on the lens holder assembly, and coating and soldering are proceeded to form the VCM assembly.

And then, the VCM assembly is mounted on a SMA unit to form the VCM-SMA OIS device.

However, the coating and soldering during the assembly process for the VCM assembly and the SMA unit are difficult, that is because coating and soldering positions will be covered by the yoke when the yoke assembly is covered on the lens holder assembly. Thus the element bonding for the VCM assembly must be made before it's mounted to the SMA unit, which causes the process complicated. During the assembly between the VCM assembly and the SMA unit, the coating and soldering space between the joining surfaces are very small due to the yoke cover, which makes the bonding further difficult. In addition, the coating and soldering must be performed artificially, and the efficiency and yield are low.

Thus, there is a need for improved assembly methods of a SMA assembly and an OIS device to overcome the drawbacks mentioned above.

SUMMARY OF THE INVENTION

One aspect of the present invention is to provide an assembly method of a SMA assembly, thereby the assembly process is simplified, the coating and soldering space become big to facilitate the bonding process, and the joining force between the SMA unit and the lens holder unit is enhanced.

Another aspect of the present invention is to provide an assembly method of an OIS device, thereby the assembly process for the SMA assembly is simplified, the coating and soldering space become big to facilitate the bonding process, and the joining force between the SMA unit and the lens holder unit is enhanced.

To achieve above objectives, an assembly method of a SMA (Shape Memory Alloy) assembly includes step (1), disposing a lens holder unit on a SMA unit, the lens holder unit being provided with a first spring, a lens holder and a coil that are mounted on the first spring, with the first spring pressed against a mounting surface of the SMA unit; and step (2), bonding the first spring of the lens holder unit with the mounting surface of the SMA unit.

As a preferred embodiment, the step (2) further comprises coating glue from a through hole of the first spring to the mounting surface of the SMA unit, with partial mounting surface of the SMA exposed on the through hole.

As another preferred embodiment, the step (2) further comprises welding a leg of the first spring with the mounting surface of the SMA unit, with the leg rested on the mounting surface.

Preferably, before the step (2) the method further includes: disposing a spacer unit on the first spring, with the spacer unit contacted with the mounting surface of the SMA unit; and bonding the spacer unit with the first spring and the mounting surface.

Preferably, the method further comprises locating the spacer unit near a through hole of the first spring whereby partial mounting surface of the SMA unit is exposed, said bonding the spacer unit with the first spring and the mounting surface comprises coating glue on the through hole and a side of the spacer unit.

Preferably, the SMA unit includes a bottom that is mounted thereon and provided with the mounting surface.

An assembly method of an OIS device, includes assembling a SMA assembly according to steps (1) and (2) mentioned above; bonding a yoke assembly on the SMA assembly, the yoke assembly being provided with a yoke, a second spring and magnets accepted in the yoke; and bonding a cover unit on the yoke assembly, with the yoke assembly and the SMA assembly covered by the cover unit.

As a preferred embodiment, the step (2) further comprises coating glue from a through hole of the first spring to the mounting surface of the SMA unit, with partial mounting surface of the SMA exposed on the through hole.

As another preferred embodiment, the step (2) further comprises welding a leg of the first spring with the mounting surface of the SMA unit, with the leg rested on the mounting surface.

Preferably, before the step (2) the method further includes disposing a spacer unit on the first spring, with the spacer unit contacted with the mounting surface of the SMA unit; and bonding the spacer unit with the first spring and the mounting surface.

Preferably, the method further comprises locating the spacer unit near a through hole of the first spring whereby partial mounting surface of the SMA unit is exposed, said bonding the spacer unit with the first spring and the mounting surface comprises coating glue on the through hole and a side of the spacer unit.

Preferably, the SMA unit includes a bottom that is mounted thereon and provided with the mounting surface.

In comparison with the prior art, during the assembly method of the SMA assembly, the coating position and the soldering position are exposed outside, without covered by additional elements such as a yoke of a VCM, thus the coating and soldering space are big, which facilitates the bonding process to improve assembly efficiency. Furthermore, the coating process can be done after the lens holder unit is assembled with the SMA unit, thus the joining force therebetween is enhanced. In addition, because the first spring of the lens holder unit can be directly mounted on the mounting surface of the SMA unit, thus a bottom can be reduced by comparison with the conventional structure, which simplifies the structures of SMA assembly and the OIS device.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to assembly methods for a SMA assembly and an OIS device, thereby the assembly process for the SMA assembly is simplified, the coating and soldering space become big to facilitate the bonding process, and the joining force between the SMA unit and the lens holder unit is enhanced.

Figure 1:
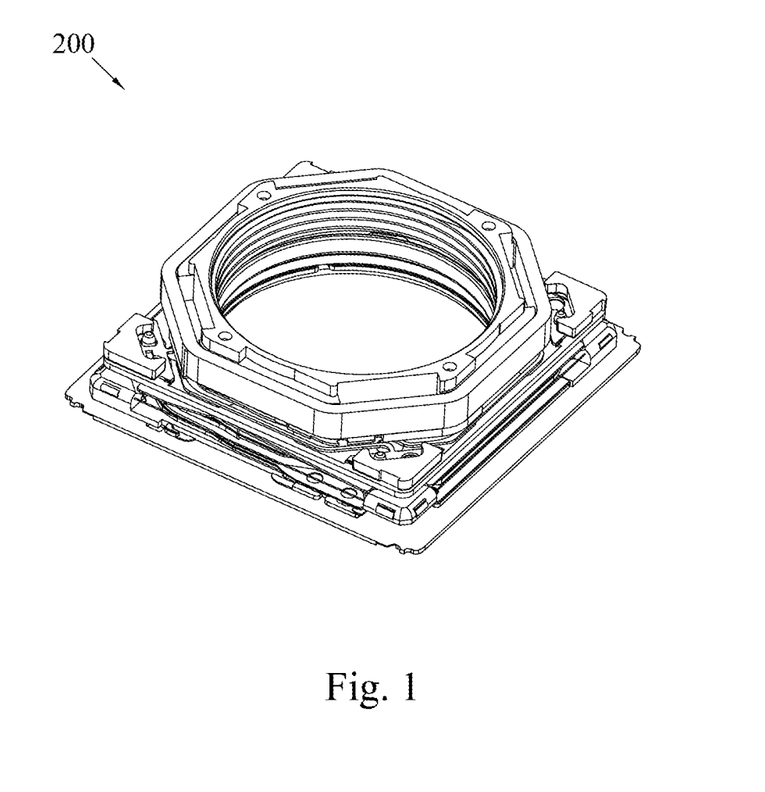
FIG. 1 is a perspective view of a SMA assembly according to a first embodiment of the present invention.
Figure 2:
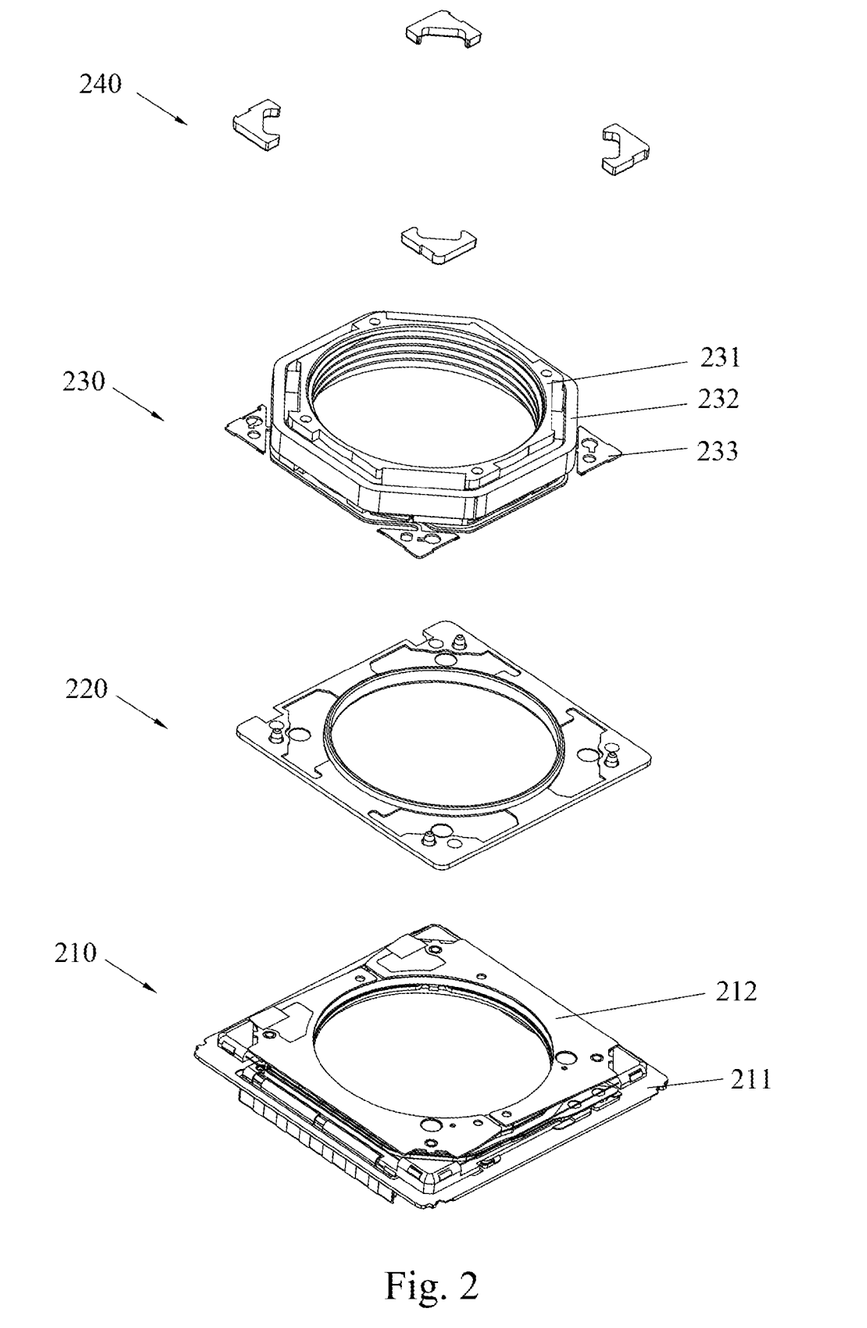
FIG. 2 is an exploded perspective view of FIG. 1.

Referring to FIGS. 1 and 2, a SMA assembly 200 according to a first embodiment of the present invention includes a SMA unit 210, a bottom 220, a lens holder unit 230 and a spacer unit 240, each of which provides a coaxial center hole. Specifically, the SMA unit 210 made of shape memory alloy includes a main body 211 and a mounting surface 212. The bottom 220 is mounted on the mounting surface 212 of the SMA unit 210 for supporting the lens holder unit 230. It should be noted that, the bottom 220 is optional and can be omitted in other embodiments. The detailed structures of the SMA unit 210 are well known the persons skilled in the art, thus are omitted here. The lens holder unit 230 includes a lens holder 231 for holding lens, such as lens barrel, focus lens or zoom lens, etc. therein, a coil 232 winding around the lens holder 231, and a first spring 233 for supporting the lens holder 231 and the coil 232 and protecting the lens barrel, etc.

Figure 3:
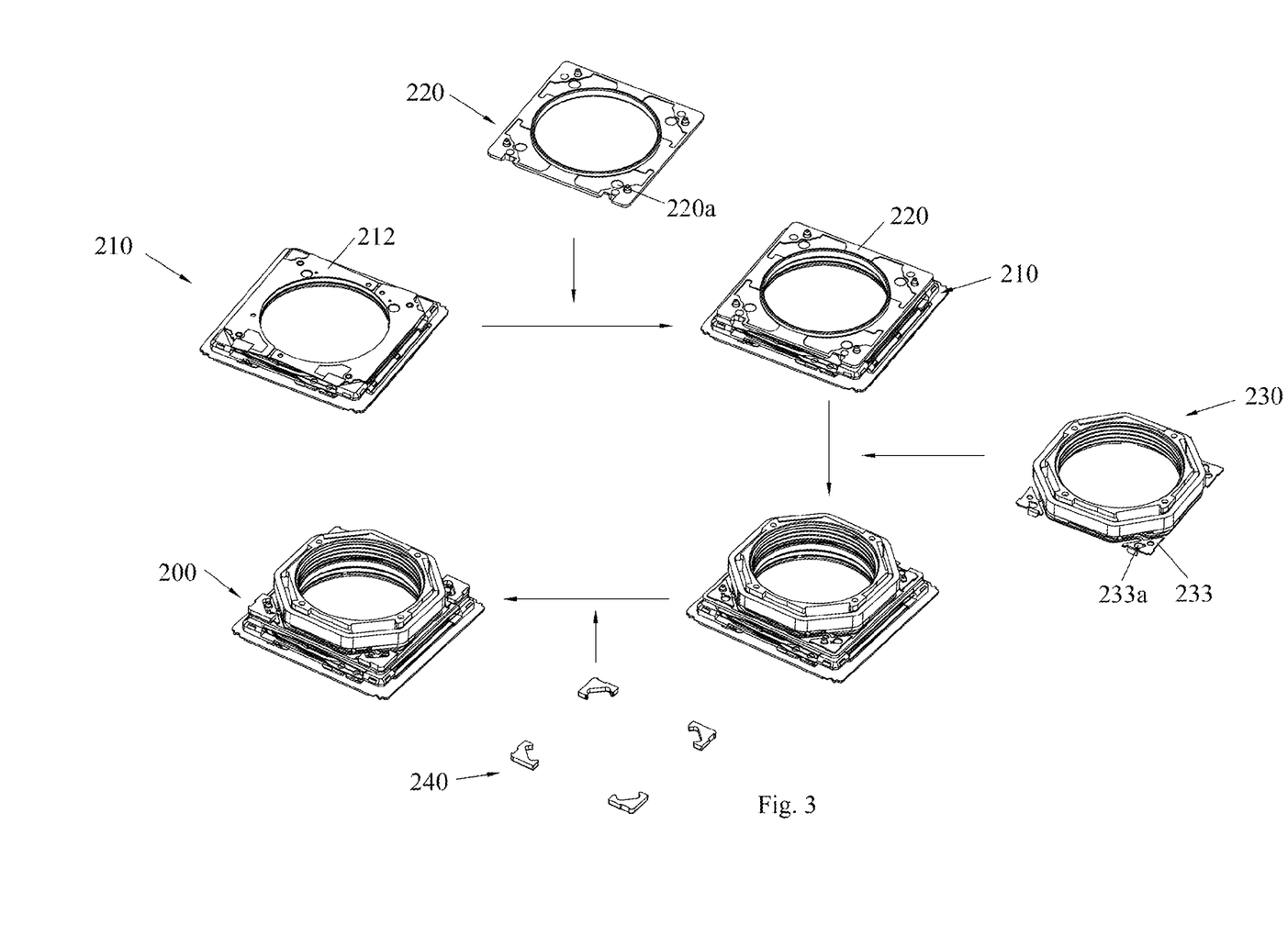
FIG. 3 shows an assembly process of the SMA assembly.

Following is the assembly process for this SMA assembly 200 according to the present embodiment.

First, mounting the bottom 220 on the SMA unit 210. Specifically, the bottom 220 is disposed on the mounting surface 212 of the SMA unit 210, and is joined by means of coating glue, for example, so that the bottom 220 can be joined temporarily.

Second, mounting the lens holder unit 230 on the SMA unit 210. Specifically, the lens holder unit 230 is assembled in advance, according to the common process, and then the lens holder unit 230 is disposed on the bottom 220, and alignment is made. Preferably, in the assembly process of the lens holder unit 230, a spacer unit 240 can be assembled for enhancing the structure stability between the first spring 233 and the bottom 220. Specifically, the spacer unit 240 is supported by the hollowed first spring 233, with the spacer unit 240 is contacted with the bottom 220 when the lens holder unit 230 is placed on the bottom 220. Specifically, the first spring 233 of the lens holder unit 230 is pressed against the surface of the bottom 220, and a through hole 233a of the first spring 233 is aligned with a through hole 220a of the bottom 220. After that, the bonding process between the lens holder unit 230 and the bottom 220 with the SMA unit 210 is made.

Figure 4A:
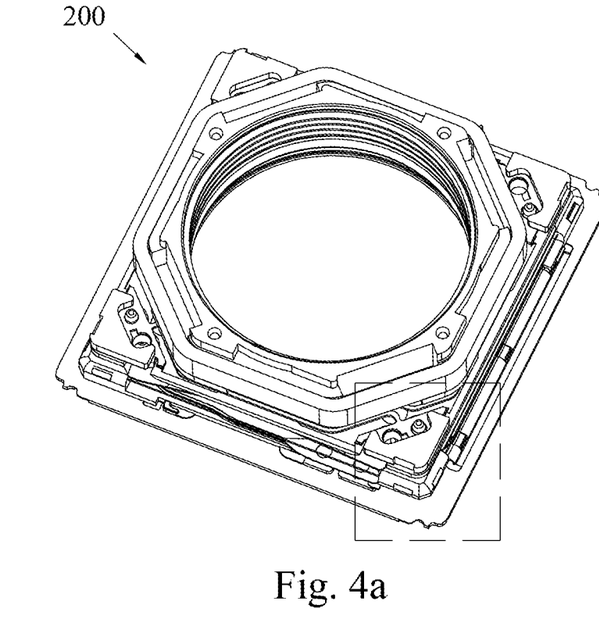
FIGS. 4a and 4b shows the coating position between the SMA unit and the lens holder unit.
Figure 4B:
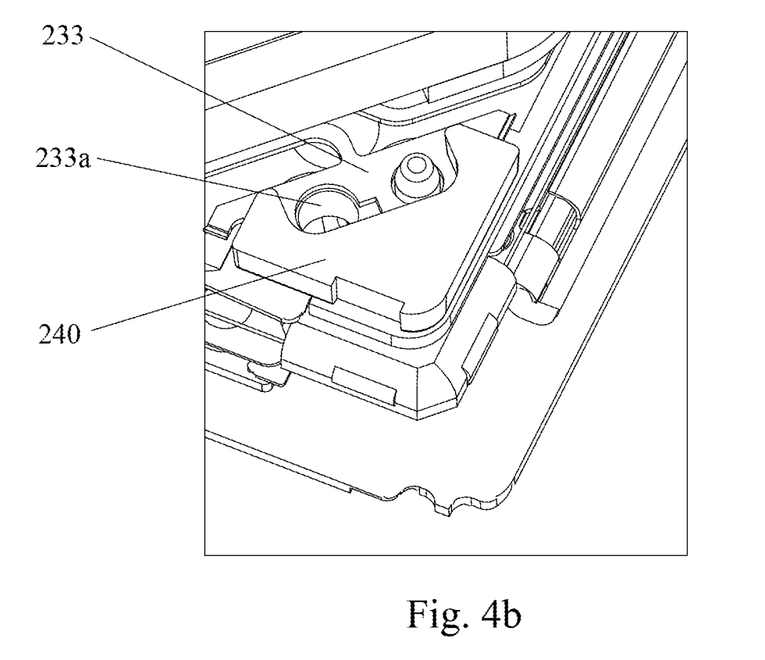

More specifically, the bonding process includes coating and soldering. In the coating process, glue is coated along the through holes 233a and 220a. Partial mounting surface 212 of the SMA unit 210 is exposed, due to the through holes 233a and 220a. Therefore, coating in the through holes 233a, 220a can realize the bonding among the first spring 233, the bottom 220 and the SMA unit 210. FIGS. 4a and 4b shows the coating position. More preferably, the spacer unit is located near the through hole 233a. The coating process includes coating glue in the through hole 233a and the on a side of the spacer unit 240. In other words, glue coated in the coating position (the through hole 233a and the side of the spacer unit 240) will be spread on the first spring 233, the bottom 220, the SMA unit 210 and the spacer unit 240.

Figure 5A:
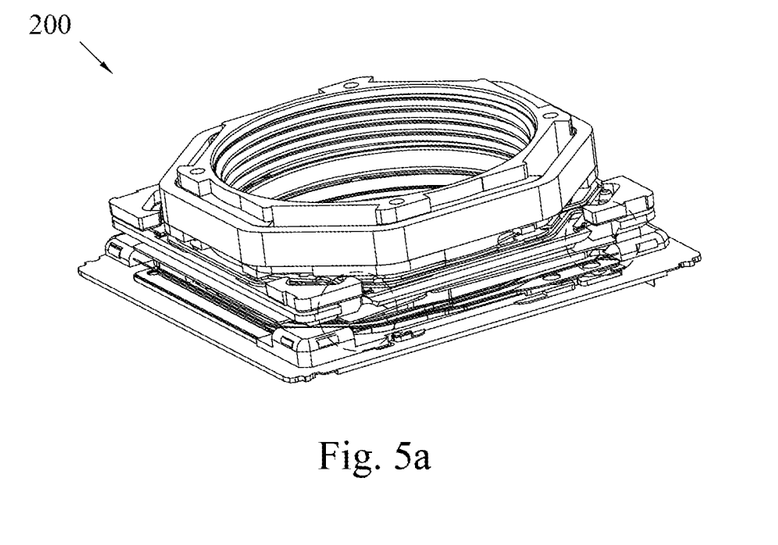
FIGS. 5a and 5b show the soldering position between the SMA unit and the lens holder unit.
Figure 5B:
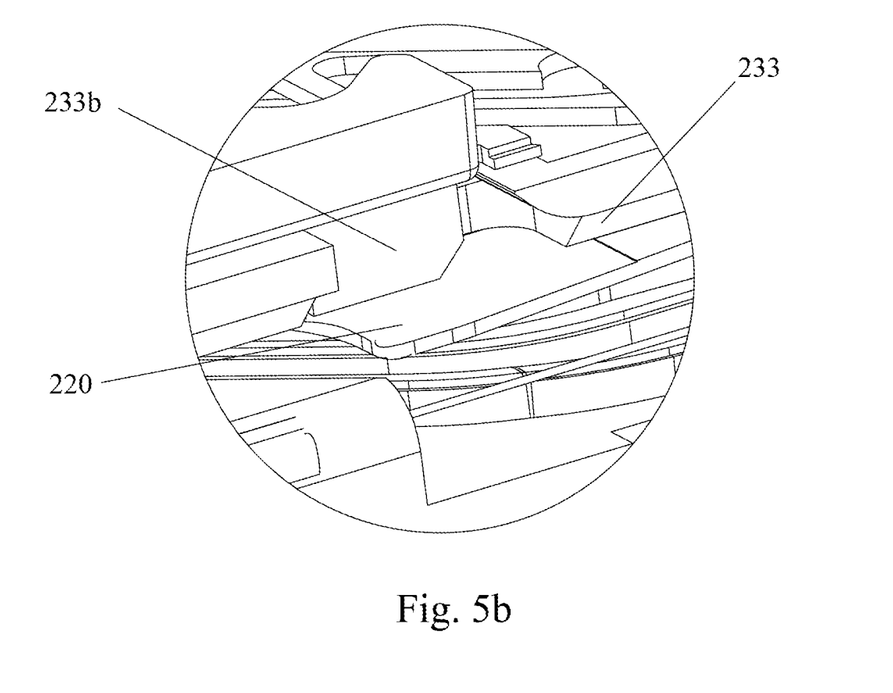

In the soldering process, the soldering is proceeded between a leg 233b of the first spring 233 and the bottom 220 of the SMA unit 210, for achieving a firm connection. Preferably, the leg 233b of the first spring 233 is rested on the surface of the bottom 220. Since no additional element is covered on the lens holder unit, thus soldering between the first spring and the bottom 220 is easy. FIGS. 5a and 5b show the soldering position.

By this token, the coating position and the soldering position are exposed outside, without covered by additional elements such as a yoke of a VCM, thus the coating and soldering space are big, which facilitates the bonding process to improve assembly efficiency. Furthermore, the coating process can be done after the lens holder unit 230 is assembled with the SMA unit 210, thus the joining force therebetween is enhanced. In addition, because the first spring 233 of the lens holder unit 230 can be directly mounted on the mounting surface 233a of the SMA unit, thus the bottom can be reduced by comparison with the conventional structure, which simplifies the structures of SMA assembly and the OIS device.

Figure 6:
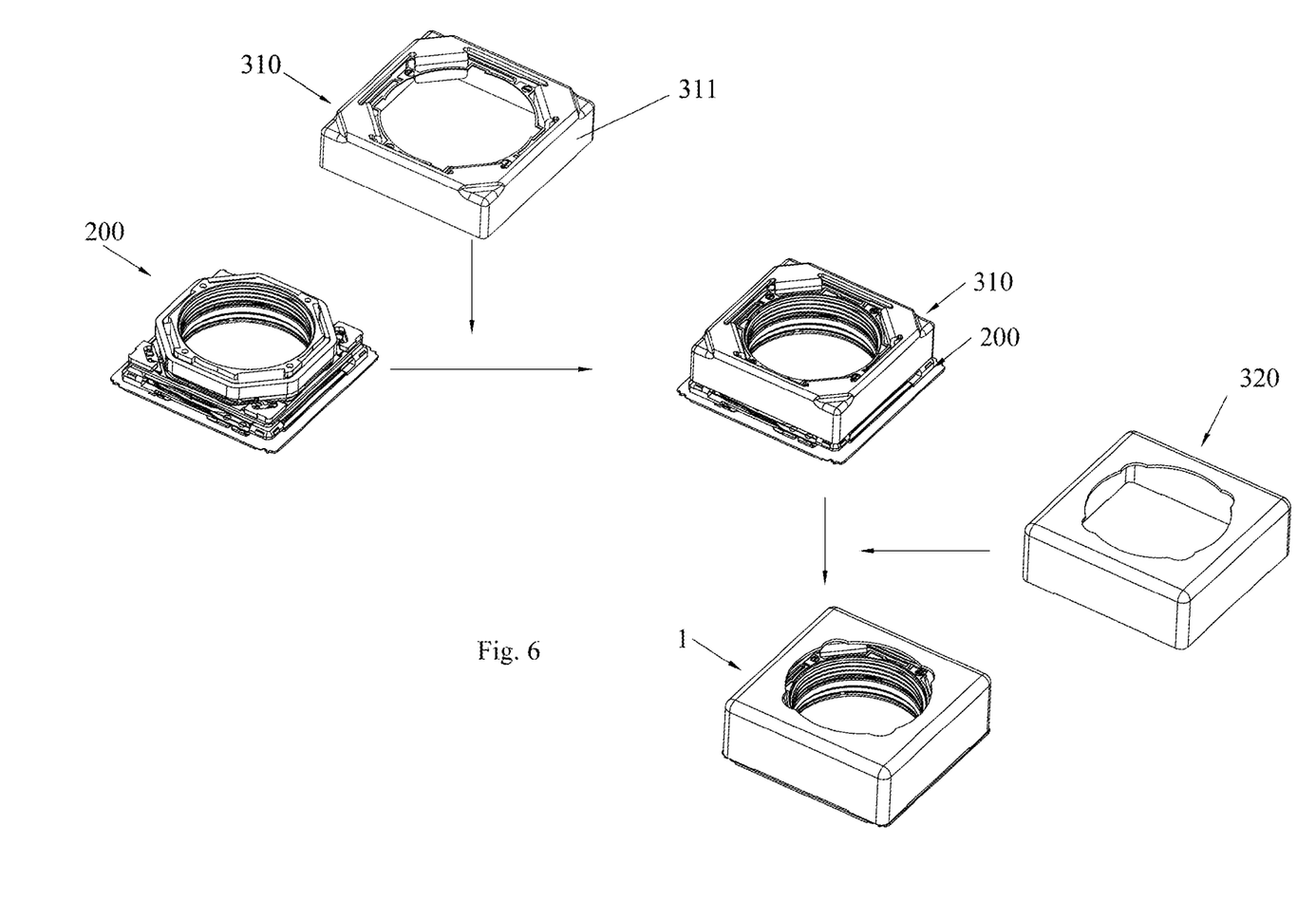
FIG. 6 shows an assembly process of an OIS device according to one embodiment of the present invention.

The SMA assembly 200 can be assembled with a yoke assembly 310 and a cover unit 320 to form an OIS device 1. Following is the assembly process.

As shown in FIG. 6, concretely, the yoke assembly 310 includes magnets (not shown), a coil (not shown) and a yoke 311 covering the magnets and the coil. The magnets are disposed at corners of the yoke, and the coil is disposed beside the magnets, these elements are assembled to form the yoke assembly. And then, the yoke assembly is bonded to the SMA assembly by means of UV soldering, and a cover unit 320 is bonded to the yoke assembly by means of coating and UV soldering for example, to form an OIS device. It should be noted, the assembly methods for the yoke assembly 310 and the cover unit 320 can apply the conventional methods, and the more detailed descriptions are omitted here.

Figure 7:
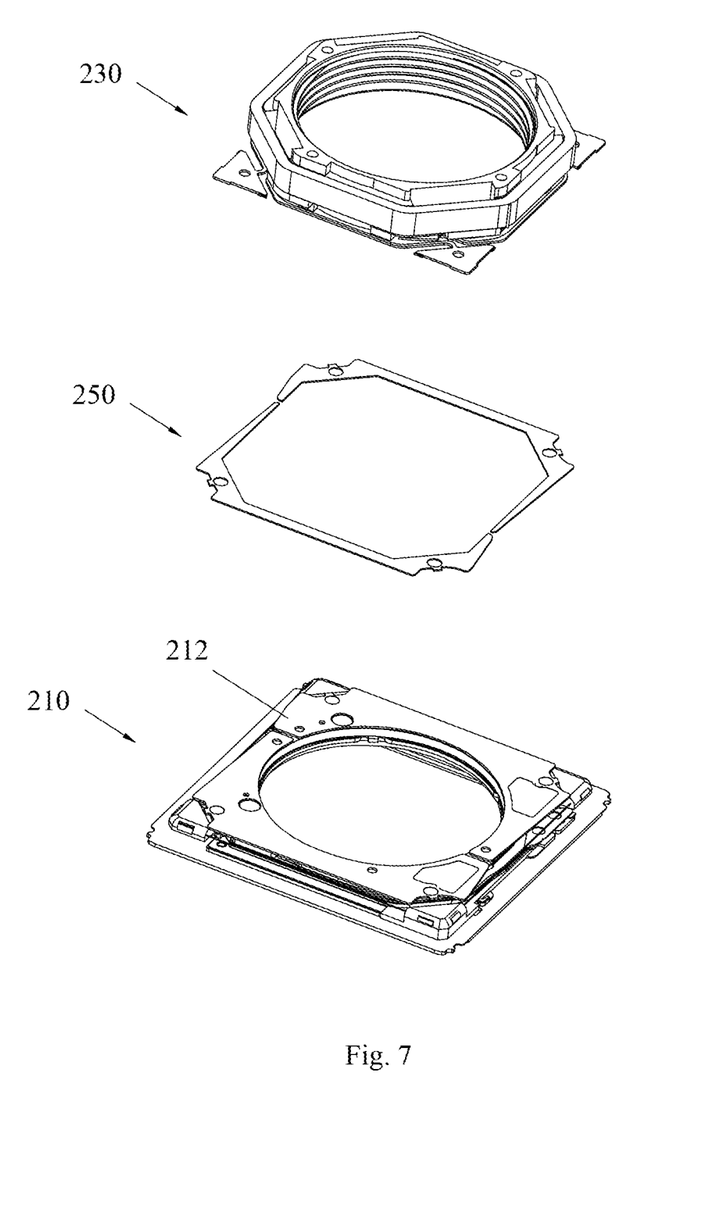
FIG. 7 is an exploded perspective view of a SMA assembly according to a second embodiment of the present invention.

As another embodiment, as shown in FIG. 7, for reducing the total thickness of the OIS device, the bottom between the SMA unit 210 and the lens holder unit 230 is removed, thus the lens holder unit 230 is mounted on the mounting surface 212 of the SMA unit 210 by mean of an insulating layer 250 sandwiched therebetween. Under this condition, the spacer unit may be canceled. The assembly processes of the SMA assembly and the OIS device with these configuration changes are similar to the first embodiment, and the coating position and the soldering position are exposed outside, without covered by the yoke 311, thus the coating and soldering space are big, which facilitates the bonding process to improve assembly efficiency. Furthermore, the coating process can be done after the lens holder unit 230 is assembled with the SMA unit 210, thus the joining force therebetween is enhanced.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An assembly method of an SMA (Shape Memory Alloy) assembly, comprising:
    step (1), disposing a lens holder unit on an SMA unit, the lens holder unit being provided with a first spring, a lens holder and a coil, the lens holder and the coil being mounted on the first spring, the first spring being pressed against a mounting surface of the SMA unit; and
    step (2), bonding the first spring of the lens holder unit with the mounting surface of the SMA unit, and coating glue from a through hole of the first spring to the mounting surface of the SMA unit, at least a part of the mounting surface of the SMA being exposed on the through hole.

2. The assembly method according to claim 1, wherein the step (2) further comprises welding a leg extending from the first spring with the mounting surface of the SMA unit, the leg being rested on the mounting surface.

3. The assembly method according to claim 1, before the step (2) further comprising:
    disposing a spacer unit on the first spring, the spacer unit contacting with the mounting surface of the SMA unit; and
    bonding the spacer unit with the first spring and the mounting surface.

4. The assembly method according to claim 3, further comprising locating the spacer unit near a through hole of the first spring whereby at least a part of the mounting surface of the SMA unit is exposed, said bonding the spacer unit with the first spring and the mounting surface comprising coating glue on the through hole and a side of the spacer unit.

5. The assembly method according to claim 1, wherein the SMA unit includes a bottom that is mounted thereon and provided with the mounting surface.

6. An assembly method of an OIS (Optical Image Stabilizer) device, comprising:
    assembling an SMA assembly according to steps (1) and (2) in claim 1;
    step (3), bonding a yoke assembly on the SMA assembly, the yoke assembly being provided with a yoke, a second spring and magnets being received in the yoke; and
    step (4), bonding a cover unit on the yoke assembly, the yoke assembly and the SMA assembly being covered by the cover unit.

7. The assembly method according to claim 6, wherein the step (2) further comprises welding a leg extending from the first spring with the mounting surface of the SMA unit, the leg resting on the mounting surface.

8. The assembly method according to claim 6, before the step (2) further comprising:
    disposing a spacer unit on the first spring, the spacer unit contacting with the mounting surface of the SMA unit; and
    bonding the pacer assembly with the first spring and the mounting surface.

9. The assembly method according to claim 8, further comprising locating the spacer unit near a through hole of the first spring whereby at least a part of the mounting surface of the SMA unit is exposed, said bonding the pacer assembly with the first spring and the mounting surface comprises coating glue on the through hole and a side of the spacer unit.

10. The assembly method according to claim 6, wherein the SMA unit includes a bottom that is mounted thereon and provided with the mounting surface.

* * * * *